(12) United States Patent
Fiorletta et al.

(10) Patent No.: US 6,768,936 B2
(45) Date of Patent: Jul. 27, 2004

(54) AUTOMATED CONTROL SYSTEM FOR VEHICLE LEVELING AND ELIMINATION OF TORSION IN A VEHICLE CHASSIS

(75) Inventors: Carl A. Fiorletta, Plano, TX (US); Richard V. Burnes, Jr., Allen, TX (US)

(73) Assignee: Preston Product Design & Development, Plano, TX (US)

( * ) Notice: Subject to any disclaimer, the term of this patent is extended or adjusted under 35 U.S.C. 154(b) by 0 days.

(21) Appl. No.: 10/656,016

(22) Filed: Sep. 5, 2003

(65) Prior Publication Data

US 2004/0049330 A1 Mar. 11, 2004

Related U.S. Application Data

(60) Provisional application No. 60/408,991, filed on Sep. 9, 2002.

(51) Int. Cl.$^7$ .................................................. G06F 7/00
(52) U.S. Cl. ........................................... 701/37; 701/36
(58) Field of Search ............................ 701/36, 37, 1; 280/427, 432

(56) References Cited

U.S. PATENT DOCUMENTS

| | | | | | |
|---|---|---|---|---|---|
| 6,145,864 | A | * | 11/2000 | Sutherland | 280/432 |
| 6,662,642 | B2 | * | 12/2003 | Breed et al. | 73/146 |
| 6,702,265 | B1 | * | 3/2004 | Zapletal | 267/187 |

* cited by examiner

*Primary Examiner*—Richard M. Camby

(57) ABSTRACT

An electronic control system is provided to measure chassis twist from the front of the chassis to the rear of the chassis, determine the extent and direction of twist, resolve the data to eliminate the twist without inducing further stress to the chassis and secondarily, level the chassis with respect to earth after the torsion or twist of the chassis has been eliminated to achieve a planar condition. The system comprises two, two-axis tilt measurement sensors, a host control for data collection and system operation, a remote mounted diagnostics port, a user interface for the owner, operator or driver to initiate system operation and display of vehicle movement during the planarization process, with an external interface to pneumatic, hydraulic or electromechanical systems used to raise and lower each corner of the vehicle.

2 Claims, 6 Drawing Sheets

AUTOMATED CONTROL SYSTEM FOR VEHICLE LEVELING AND ELIMINATION OF TORSION IN A VEHICLE CHASSIS

CROSS-REFERENCE TO RELATED APPLICATIONS

This application claims priority from U.S. Provisional Patent Application No. 60/408,991 filed Sep. 9, 2002, confirmation number 5781, article number 4002 0860 0004 9741 2004, titled Automated Control System for Vehicle Leveling and Elimination of Torsion in a Vehicle Chassis.

BACKGROUND OF THE INVENTION

Recreational vehicles have become a very popular way of traveling, especially for extended periods of time. These vehicles are equipped with a wide variety of amenities that are normally found in a residence. These include fully appointed kitchens, complete bathrooms, laundry facilities, and entertainment centers. For many years, trailers have incorporated expandable rooms, sometimes called slide-outs, to increase the interior space while parked and yet maintain legal size requirements while in motion. In the past decade, expandable rooms have become very common in motorhome applications. Owners continue to want more space and more luxurious amenities. In recent years, consumer demands have resulted in manufacturers adding multiple slide-outs to their production models, sometimes as many as four or five in a forty or forty-five foot model. The next generation motorhome, travel trailer and fifth wheel will replace the multiple slide-out modules with one or two large slide-out modules. As these modules get longer, up to 30 ft in length or more, which will replace multiple slide-outs of length that range from 8 to 12 ft, care must be taken to eliminate the twist or torsion in the chassis. In normal operation of an RV, when the vehicle is parked on an uneven surface whereby one wheel at any of the four corners of the chassis rests in a position or plane that is higher or lower than the plane defined by the point of rest of the wheels on the other three corners of the chassis, the overall chassis will then be twisted, or in engineering terms, in torsion. This twist will distort the chassis and the RV structure that is attached. This distortion will make it impossible to extend and retract the above mentioned slide-out modules with ease and reliability. A large slide-out module that is extended to enjoy the larger living space becomes a liability if the module will not retract due to the distorted or twisted chassis, which makes retraction of the slide-out module impossible. If the slide-out cannot be retracted, the RV cannot be moved, a very serious inconvenience.

The present invention, uses two (2), two-axis sensors to measure the orientation of the vehicle chassis across the width of the chassis in addition to measurements taken along the longitudinal, fore to aft axis of the chassis. Each two-axis sensor is located at opposite ends of the trailer or motorhome chassis.

BRIEF SUMMARY OF THE INVENTION

The present invention is a solid state control system that may be used on any type of vehicle to insure that the chassis of the vehicle is level, or perpendicular to the pull of gravity, and in a single plane without twist or distortion. Planarization is the process of insuring that a vehicle, material or entity is in this non-distorted, planar condition.

The components of the control system include the host computer or microprocessor, the front, two-axis sensor, the rear, two-axis sensor, the user's control panel and a remote diagnostics port for System maintenance. Each of the front and rear sensor modules includes an electronic sensor to measure level in the X direction, the measurement taken across the width of the vehicle or chassis and the Y direction, the length of the vehicle. The first priority of the host computer is to compare the X direction readings at the front and rear of the chassis. Analysis of these data will determine the amount and direction of twist in the chassis. When the magnitude and direction of twist is determined, the host computer will resolve or eliminate the twist by raising or lowering opposite corners of the chassis. When planarization is achieved, the control will then lift either side and/or either end of the chassis to achieve a level condition. The lifting means will be inflation or deflation of the airbags that are used in the vehicle's suspension system or raising and lowering of hydraulic or electromechanical jacks located at each of the four (4) corners of the vehicle.

In addition to the host computer and the front and rear sensors, a control panel or user interface is provided for the vehicle operator. The user interface provides a pushbutton for the driver/operator to initiate the leveling sequence. In addition, a multi-line/multi character display panel or multi-color LED's may be provide to indicate which corner of the vehicle is high or low and allows the operator to observe the System in operation. The same panel will indicate to the owner/driver/user that the vehicle is planar and conditions have been met for proper operation of the slide-out modules.

DESCRIPTION OF THE PREFERRED EMBODIMENT

Figure 1:
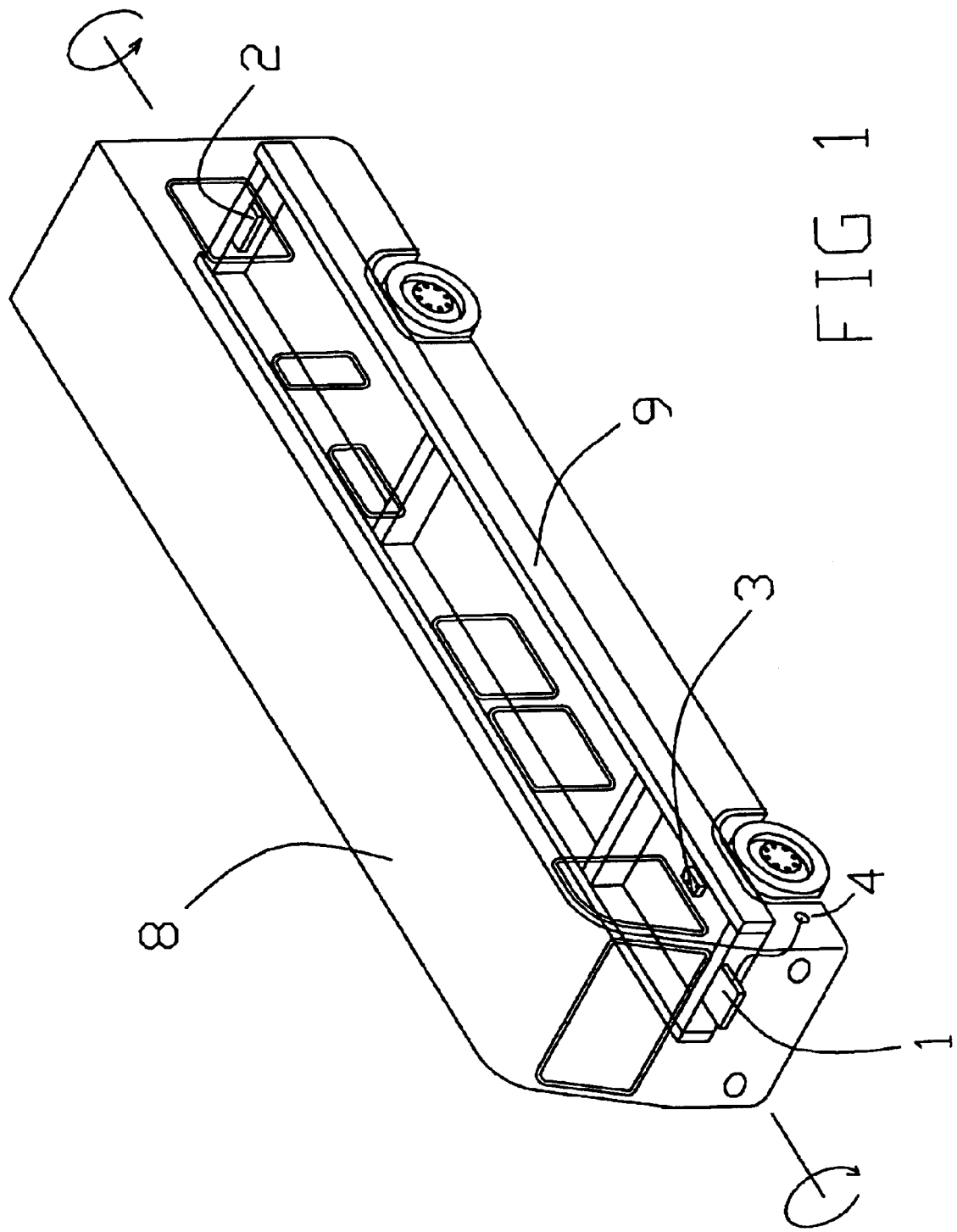
FIG. 1: Isometric view of a motorhome and chassis with control system components, the CPU-front sensor, the rear sensor, the user interface and the remote diagnostics serial port shown in their respective locations.

The preferred embodiment of the present invention consists of an integrated host CPU and two-axis sensor 1 mounted at the front of the vehicle chassis, a second, two-axis sensor 2 mounted at the rear of the vehicle chassis, a user interface 3 and a remote mounted diagnostics port 4 (FIG. 1).

Figure 6:
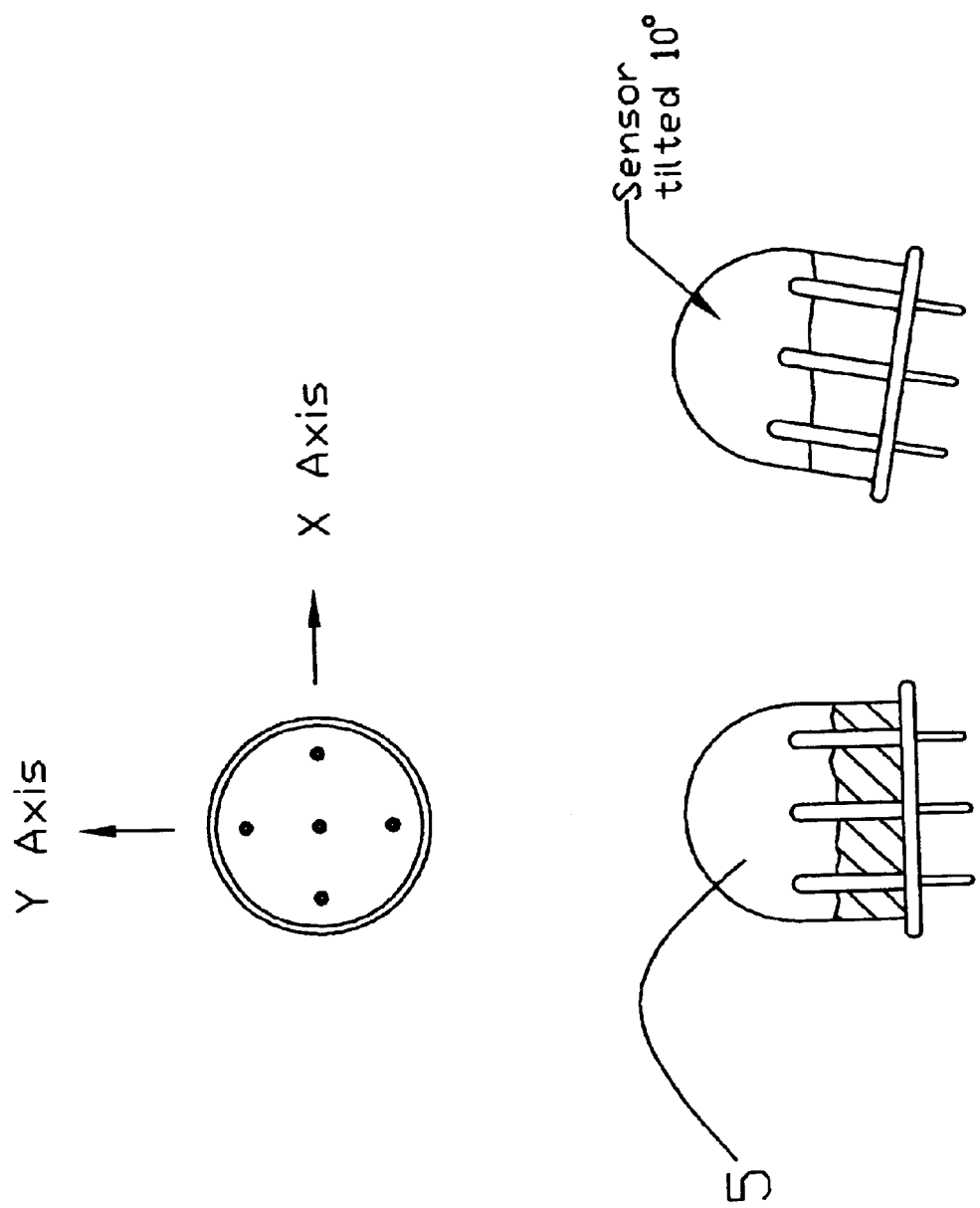
FIG. 6: Is a view of a two (2) axis, electrolytic sensor that provides extremely high resolution measurement of tilt angles. A square-wave, AC current is introduced to the electrolyte via the outside posts. The System's host controller monitors the output at the center post to calculate the magnitude and direction of tilt in the X direction, the Y direction and a combination of the two (2) axes.

Each of the front 1 and rear sensors 2 use electronic devices to measure level in two (2) directions, X and Y, as previously described as width and length respectively of the vehicle. These electronic devices could be single or dual axis accelerometers that measure acceleration in the direction of the earth's gravitational pull. These are typically used to measure the magnitude of acceleration in a specific direction or measure tilt angles with respect to gravity. These types of sensors are typically accurate to a resolution of 0.5 degrees. In the preferred embodiment of this invention, we prefer to implement two, two-axis electrolytic sensors 5 FIG. 6 to measure tilt to a resolution of two arc seconds in the X and Y directions, which is three to four orders of magnitude more accurate than systems that use accelerometers, annular cell electrolytic sensors or liquid mercury based level sensors.

Figure 4:
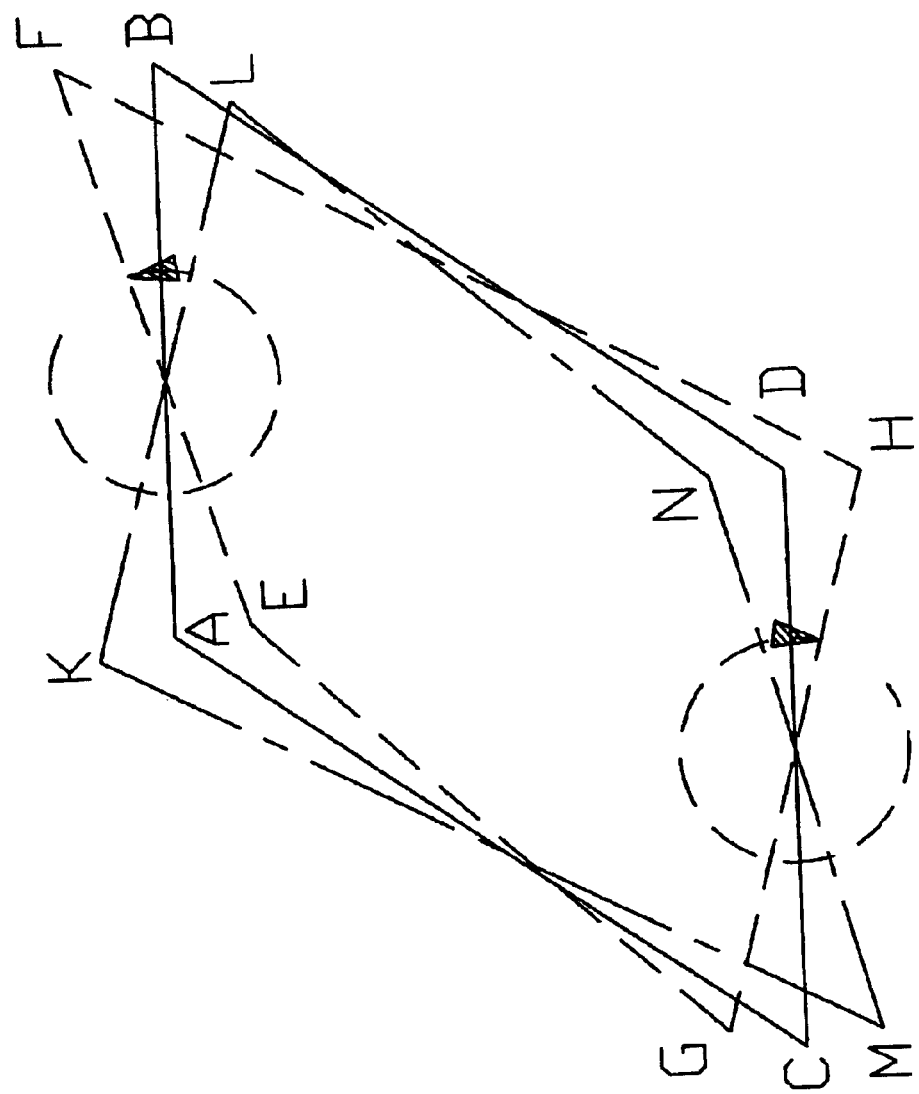
FIG. 4: Is an end view of a plane that represents a vehicle chassis showing the front of the chassis A-B and the rear of the chassis C-D shown in a planar position with no twist or distortion. The plane defined by E-F at the front and G-H at the rear describe a twisted chassis. The plane defined by K-L at the front and M-N at the rear describe the same chassis twisted in the opposite direction.

In addition to the sensors used to achieve maximum resolution of tilt measurement, the unique capabilities of the present invention lie in the control algorithms and software used to measure chassis twist FIG. 4, resolve the problem to eliminate the twist and further resolve the measurements and chassis movement to achieve a level chassis, without twist or distortion.

Figure 2:
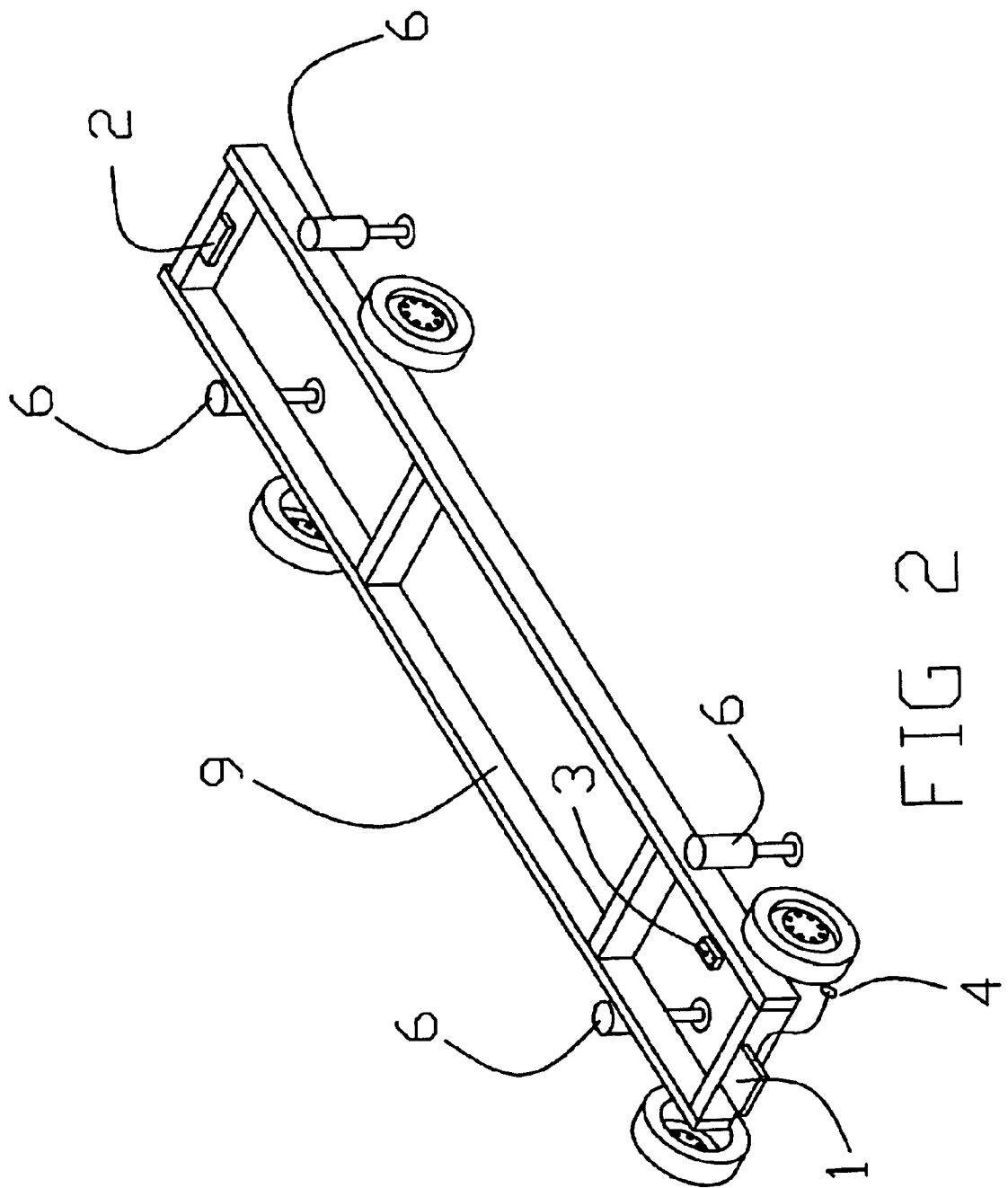
FIG. 2: Vehicle chassis with system components, the CPU-front sensor, the rear sensor, the user interface and the remote diagnostics serial port shown in their respective locations. Also shown are the typical locations for hydraulic or electromechanical lifting jacks at each corner to level and support the chassis.
Figure 3:
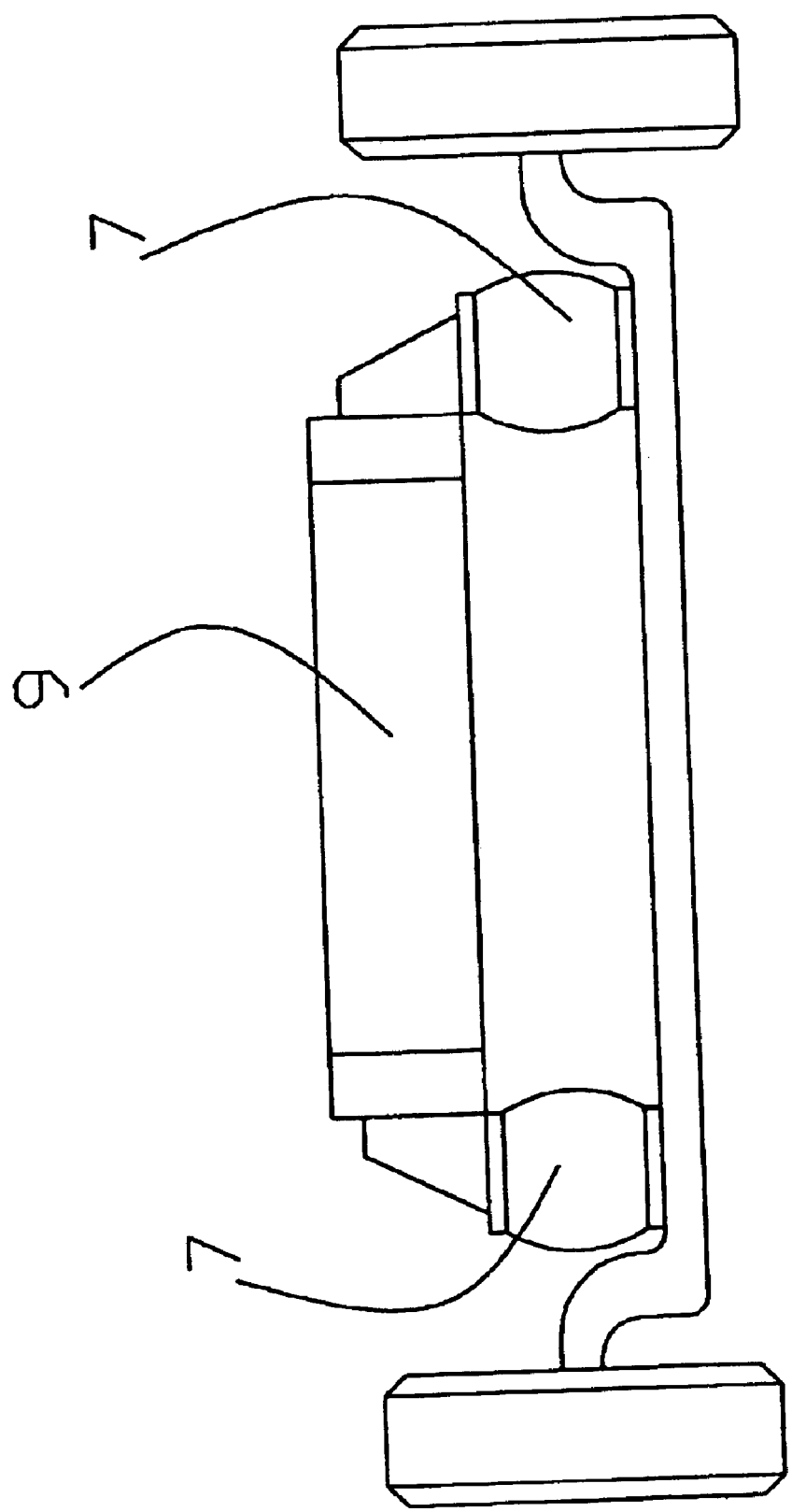
FIG. 3: End view of a chassis showing suspension air bags that are also used for chassis leveling

When a vehicle is parked on a non-level and/or non-planar surface, it undergoes stress and torsion of the structural body. These strains can cause distortion of the structure sufficient to make proper operation of slide out compartments impossible. By sensing the distortion of the vehicle and automatically operating lifting/lowering devices in at least four locations (normally one at each wheel), the structure can be restored to its proper shape, thus permitting normal operation of slide out modules. In RV applications these lifting devices are typically hydraulic or electromechanical lifting jacks 6 FIG. 2 or airbags 7, FIG. 3 that are typically found in large vehicles with pneumatic suspension systems.

A sensor module 2, FIG. 1 located in the rear of the vehicle provides lateral (left to right) and longitudinal (front to back) tilt information relevant to the rear of the vehicle on demand to the main processor. The main processor-sensor 1, FIG. 1 located in the front of the vehicle receives this information and combines it with similar front sensor data to determine the best way to correct the platform position. The controller works to restore the vehicle's position to any preprogrammed value. Normally, the factory would fully level the vehicle during manufacture, verify proper slide operation, then have the system measure and record its current position as a reference for future use. This reference position defines a chassis orientation that is level and planar, or in other words, a chassis plane without twist or distortion.

There are four phases of the positioning/structure correction operation. The first and second phase together remove torsion from the structure. The first phase moves only whichever (front or rear) lateral axis that has the most error from the desired position. The second phase begins when the error in lateral axis are equal for both front and rear. During the second phase, both lateral axes are being corrected to the desired position. They should finish about the same time. During phase three, the longitudinal, Y axis is corrected. Finally, phase four measures the quality of the position while all lifting and settling is stopped. Additional short bursts of correction are used to perfect the position. When all four phases are complete, if the result is within a preprogrammed tolerance, a signal (relay closure) is provided to indicate slide operations may begin. A diagnostics-serial port 4, FIG. 1 is provided to communicate with any other on board computers as necessary.

Figure 5:
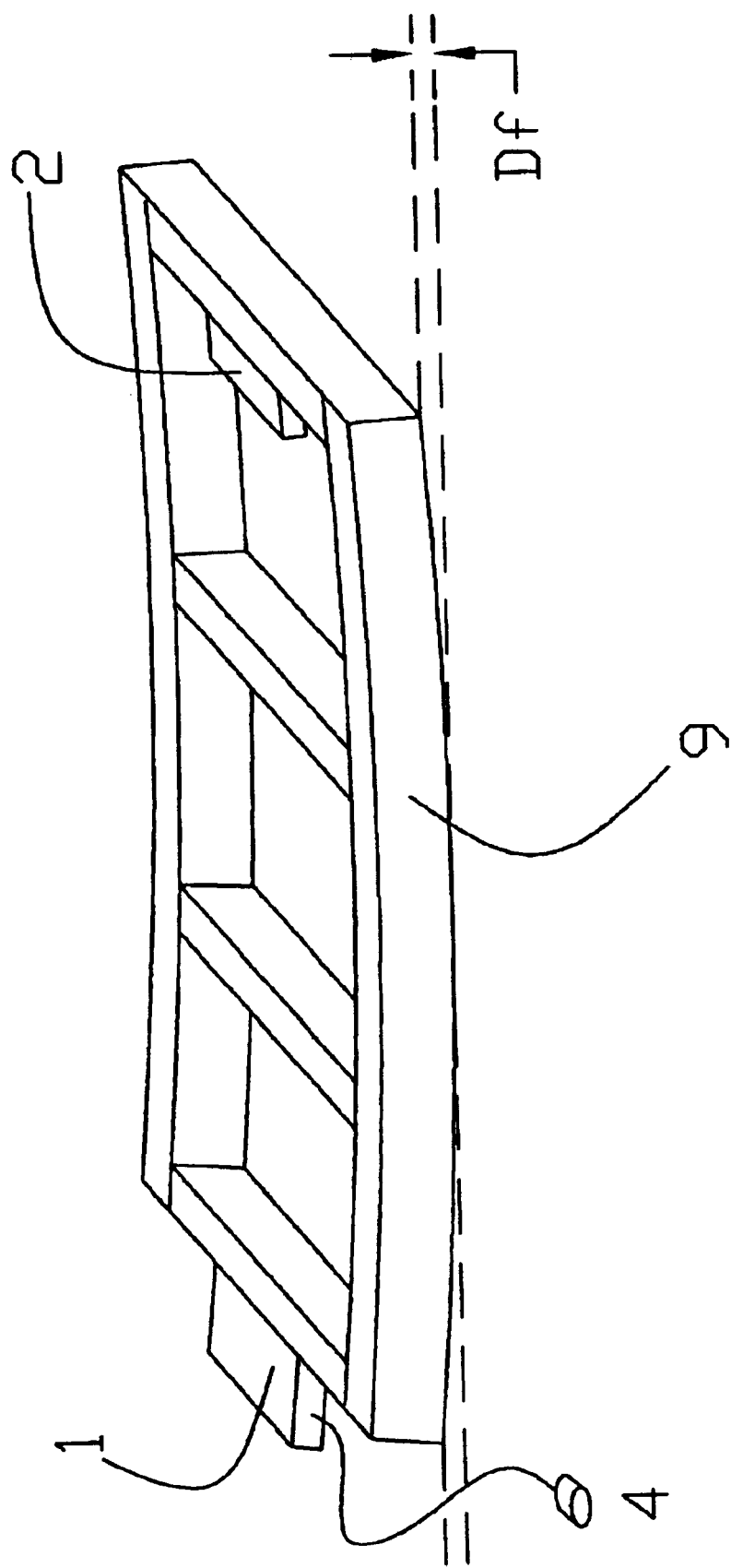
FIG. 5: Is a view of a motorhome or trailer chassis that is overloaded to the point of bending the chassis. The combination of CPU-front sensor and rear sensor will collect data for the system CPU to compute the deflection (Df).

An on board temperature sensor within the CPU module 1, FIG. 1 and measurement of actual sensor drive levels is used to compensate the raw analog data for temperature errors. Although, it is possible to build a simpler system using only a single longitudinal axis sensor, that sensor would have to be located in the center of the vehicle creating a third mounting point, by using two longitudinal sensors, one in the front and one in the rear, the third box is eliminated. Two Y axis, longitudinal sensors are used rather than just one in the front or one in the middle, so that if the vehicle is heavily loaded and sags in the center, this deflection DF, shown in FIG. 5, can be determined by comparison of the front 1 with the rear sensor 2 data and the appropriate correction made to remove or redistribute weight in the chassis to reduce or eliminate the amount of chassis deflection (Df) measured by the System.

Measuring and removing torsion of the vehicle as a method to restore proper operation of the slide out compartments is a unique capability in this patent. Additionally, the use of sensors in multiple locations to accomplish this is unique to this patent and the use of two longitudinal sensors to minimize errors caused by load variation and the use of two lateral sensors to measure torsion is unique to this patent.

While the present invention has been described for a motorhome application, the principles may be applied to any vehicle, independently powered or towable. Variations and modifications to this description could be made without departing from the scope and spirit of the invention.

The embodiments of the invention in which an exclusive property or privilege is claimed are defined as follows:

1. A system for elimination of twist and torsion within a vehicle chassis and leveling of said chassis, the system comprising a first two-axis tilt sensor rigidly mounted at the front of the vehicle chassis to measure chassis tilt at that location in the X axis (lateral direction) and Y axis (longitudinal direction);
    a second two-axis tilt sensor rigidly mounted at the rear of the vehicle chassis to measure chassis tilt at that location in the X axis (lateral direction) and Y axis (longitudinal direction);
    a host microprocessor with electrical communication to the first and second two-axis sensors to collect data to measure tilt in two axes at each of the front and rear sensor locations and;
    system software to resolve the magnitude of movement, direction of movement and sequence of motions at each of the four corners of the chassis to achieve planarization of the chassis and an overall level position with respect to the earth.

2. A host microprocessor in electrical communication with lifting mechanisms to adjust the height of the vehicle chassis at each of the four corners of the chassis to include:

electrical communication to solenoid valves used to inflate and deflate pneumatic air-springs or airbags that are used as load bearing devices in pneumatic suspension systems for large vehicles;

electrical communication to hydraulic control valves used to raise and lower hydraulic jacks that are used to lift, level and support motorhomes, trailers and fifth wheel trailers;

electrical communication to electric, linear actuators used to lift, level and support motorhomes, trailers and fifth wheel trailers;

a user interface for initiation of the leveling, planarization sequence and display of vehicle movement during the leveling process.

\* \* \* \* \*